United States Patent
Ionescu et al.

(10) Patent No.: US 10,191,789 B2
(45) Date of Patent: Jan. 29, 2019

(54) TRACING SYSTEM OPERATIONS ACROSS REMOTE PROCEDURE LINKAGES TO IDENTIFY REQUEST ORIGINATORS

(71) Applicant: CrowdStrike, Inc., Irvine, CA (US)

(72) Inventors: Ion-Alexandru Ionescu, Seattle, WA (US); Timo Kreuzer, Schonberg (DE); Aaron LeMasters, New York, NY (US)

(73) Assignee: CrowdStrike, Inc., Irvine, CA (US)

( * ) Notice: Subject to any disclaimer, the term of this patent is extended or adjusted under 35 U.S.C. 154(b) by 341 days.

(21) Appl. No.: 15/240,860

(22) Filed: Aug. 18, 2016

(65) Prior Publication Data
US 2018/0052720 A1    Feb. 22, 2018

(51) Int. Cl.
| G06F 9/54 | (2006.01) |
| G06F 21/56 | (2013.01) |
| G06F 11/36 | (2006.01) |
| G06F 21/60 | (2013.01) |
| G06F 21/55 | (2013.01) |
| G06F 11/34 | (2006.01) |

(52) U.S. Cl.
CPC .............. *G06F 9/547* (2013.01); *G06F 9/542* (2013.01); *G06F 11/3636* (2013.01); *G06F 21/554* (2013.01); *G06F 21/604* (2013.01); *G06F 11/3466* (2013.01)

(58) Field of Classification Search
CPC .................................. G06F 9/542; G06F 9/547
See application file for complete search history.

(56) References Cited

U.S. PATENT DOCUMENTS

| 6,016,558 A * | 1/2000 | Seong ................. G06F 11/3636 714/20 |
| 7,017,084 B2 * | 3/2006 | Ng ...................... G06F 11/3664 714/45 |
| 2007/0169045 A1 * | 7/2007 | Nallipogu ........... G06F 11/3409 717/151 |

(Continued)

FOREIGN PATENT DOCUMENTS

WO    WO2016118145    7/2016

OTHER PUBLICATIONS

Russinovich et al., "Microsoft Windows Internals, Fourth Edition: Microsoft Windows Server 2003, Windows XP, and Windows 2000" (2005), Microsoft Press, 4th Edition, pp. 171-177, 308-325, 802, 803.*

(Continued)

*Primary Examiner* — Brian W Wathen
(74) *Attorney, Agent, or Firm* — Lee & Hayes, PLLC

(57) ABSTRACT

A security agent implemented on a monitored computing device is described herein. The security agent is configured to receive one or more event notifications respectively associated with one or more kernel-mode events. Based on the one or more event notifications, the security agent determines that the one or more kernel-mode events are associated with user-mode processing of a request message by a RPC-utilizing process of the monitored computing device. The security agent then retrieves the request message based on information included in one or more RPC data structures and based on the one or more event notifications and identifies an originator of the request message based on metadata of the request message.

21 Claims, 3 Drawing Sheets

(56) References Cited

U.S. PATENT DOCUMENTS

2013/0247190 A1      9/2013  Spurlock
2013/0333040 A1*    12/2013  Diehl ........................ G06F 9/46
                                                       726/24
2015/0163109 A1*     6/2015  Ionescu ............... H04L 67/2804
                                                       709/224

OTHER PUBLICATIONS

The Extended European Search Report dated Dec. 14, 2017 for European Patent Application No. 17183148.0, 9 pages.

* cited by examiner

TRACING SYSTEM OPERATIONS ACROSS REMOTE PROCEDURE LINKAGES TO IDENTIFY REQUEST ORIGINATORS

BACKGROUND

Computer system administrators may collect various data related to the use of system resources to help characterize the use of the system resources, particularly with intent to prevent unauthorized access, identify malicious software, or to improve the allocation of the system resources, among other reasons.

Collection of this data may traditionally be accomplished by attaching an observer to a kernel and/or system call interface of an Operating System (OS). Accordingly, when a user-mode process requests system resources using the observed kernel system call, the observer may collect data and analyze the data as appropriate.

Further, Operating Systems have functionality to support interfaces to system resources other than kernel systems calls. For example, an OS may provide functionality via a Remote Procedure Call (RPC) interface. In some instances, the RPC interface may be implemented as a Local Procedure Call (LPC) interface configured to use RPC-style transport, serialization, and runtime-binding to perform LPC system calls without actually sending a call to a remote system.

Some LPC interfaces exist entirely in user-mode, preventing any meaningful, traditional form of observation by intercepting kernel system calls. Other LPC interfaces also reside in user-mode and can make one or more chained kernel system calls on behalf of the client, thereby masking the identity of the client process because the system call may appear to originate from the LPC interface.

In general, the source/originator of an operation performed by an LPC interface on behalf of the requestor may not lend itself to direct observation by a kernel system call as described above. Thus, despite the use of various kernel observers, any calls made to the LPC interface may remain uncollected and unanalyzed. Accordingly, the computer system administrators may capture an incomplete picture of the use of system resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a security agent implemented on a monitored computing device. The security agent is configured to receive one or more event notifications respectively associated with one or more kernel-mode events. Based on the one or more event notifications, the security agent determines that the one or more kernel-mode events are associated with user-mode processing of a request message by an RPC-utilizing process of the monitored computing device. As used herein, "RPC-utilizing process" may refer to any program that utilizes the RPC library as a communication interface. The security agent then retrieves the request message based on information included in one or more data structures associated with the RPC-utilizing process and based on the one or more event notifications and identifies an originator of the request message based on metadata of the request message. If the request message is determined to be associated with malicious activity, the security agent may then take a preventative action, such as halting the user-mode processing of the request message by the RPC-utilizing process, stopping the execution of the originator, or misleading the originator.

In various implementations, retrieving the request message may include receiving the event notification(s) and determining a thread environment block (TEB) associated with a current thread. That current thread may be associated with the kernel-mode event(s) and may be a worker-thread of an RPC-utilizing process. The current thread may further be a user-mode thread that is associated with the user-mode processing by the RPC-utilizing process of the request message. After determining the TEB, the security agent may determine a pointer in the TEB to an RPC-specific field of an OS data structure and may retrieve the request message from that RPC-specific field.

Example Overview

Figure 1:
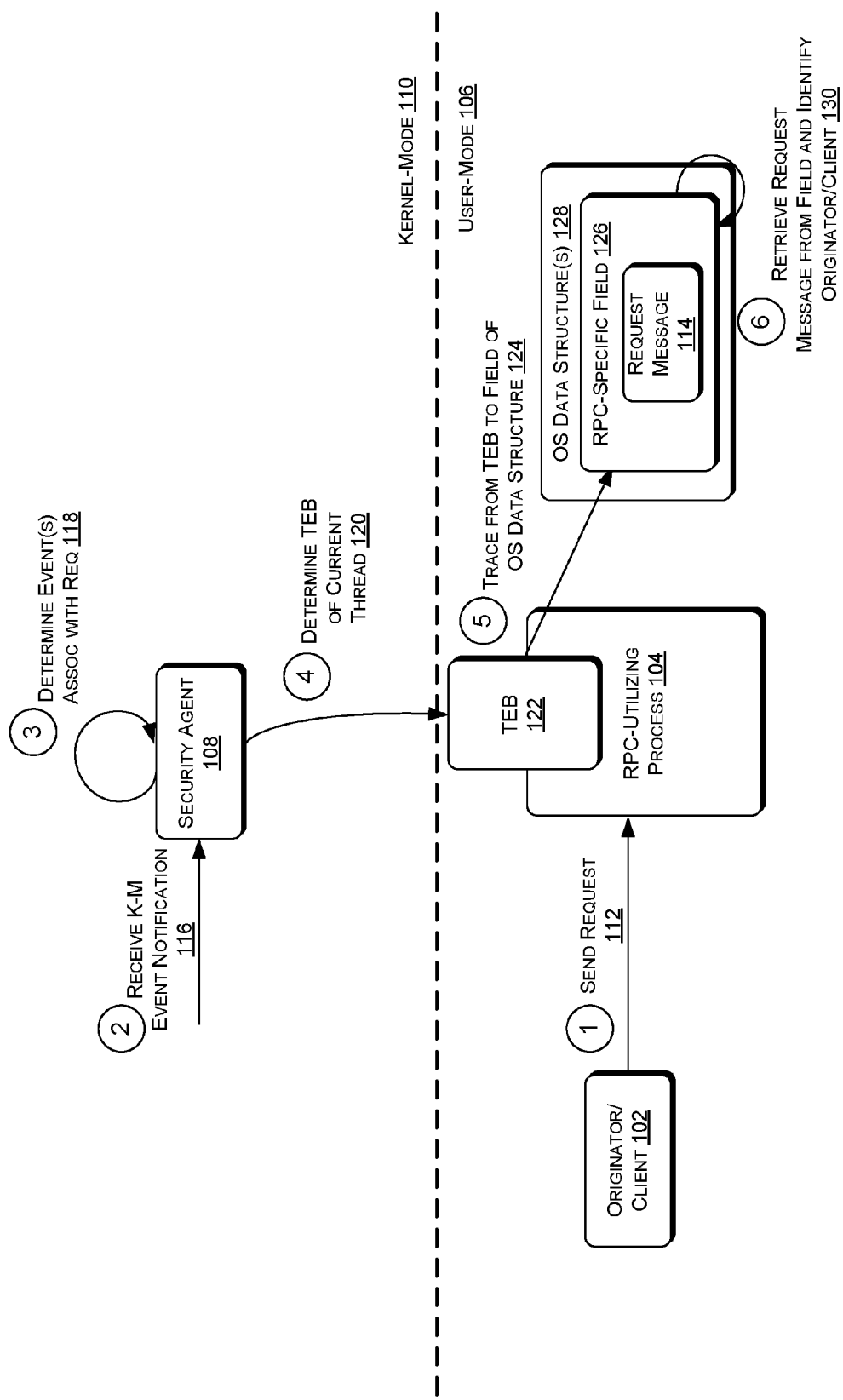
FIG. 1 illustrates an example overview of a security agent configured to detect, from kernel-mode, user-mode processing of a request message by an RPC-utilizing process and to identify an originator of that request message.

FIG. 1 illustrates an example overview of a security agent configured to detect, from kernel-mode, user-mode processing of a request message by an RPC-utilizing process and to identify an originator of that request message. As illustrated in FIG. 1, an originator/client application 102 (hereinafter referred to as originator 102) and an RPC-utilizing process 104 may reside in user-mode 106 of a computing device and a security agent 108 may reside, for example, in kernel-mode 110 of that computing device. The originator 102 may send, at 112, a request message 114 to the RPC-utilizing process 104. The RPC-utilizing process 104 then processes the request message 114 in user-mode and, as part of that processing, makes one or more kernel-mode requests, such as requests to create processes or threads or to read or write registry keys. At 116, the security agent 108 receives event notifications for kernel-mode events associated with the kernel-mode requests. Based on one or more of these event notifications, the security agent determines, at 118, that the RPC-utilizing process 104 is processing request message 114. The security agent 108 then determines, at 120, a data structure, such as a thread environment block (TEB) 122, of a current thread, which may be the work thread of the RPC-utilizing process that made the one or more kernel-mode requests. The security agent 108 then traces, at 124, from the TEB 122 to a field of OS data structure(s), such as an RPC-specific field 126 of OS data structure(s) 128. At 132, the security agent 108 then retrieves the request message 114 from the RPC-specific field 126.

Figure 2:
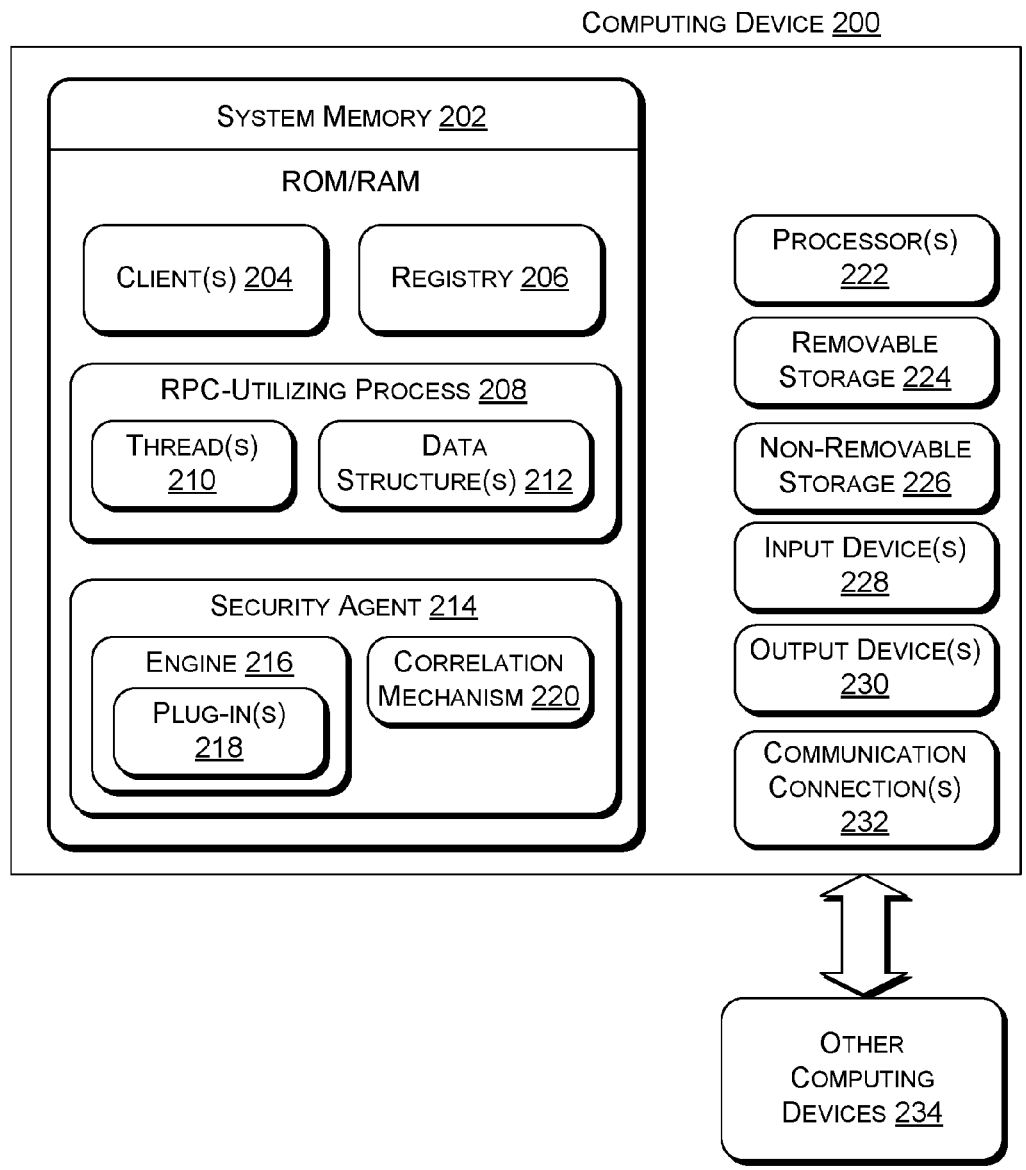
FIG. 2 illustrates a component level view of a monitored computing device configured with an RPC-utilizing process to handle request messages in user-mode and a security agent to detect, from kernel-mode, the user-mode processing of those request messages.

In various implementations, the computing device implementing the originator 102, RPC-utilizing process 104, and security agent 108 may be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some implementations, the computing device may represent a virtual machine implemented on a computing device. An example computing device capable of serving as the computing device implementing the originator 102, RPC-utilizing process 104, and security agent 108 is illustrated in FIG. 2 and described below with reference to that figure.

In some implementations, the originator 102 is a client application that makes a request through the RPC-utilizing process 104. Such a request, embodied in request message 114, may be, for example, a domain name service query, a request to print a document, a request to change a firewall setting, or a request to create a new account. The originator 102 may be on a same computing device as the RPC-utilizing process 104 or may be on a different computing device. Also, the originator 102 may communicate directly with the RPC-utilizing process 104 or may cause another process or thread to communicate the request message 114 to the RPC-utilizing process 104. For example, the originator 102 may provide a command through a command shell that results in the sending of the request message 114, at 112 to the RPC-utilizing process 104. In another example, the originator 102 may, through another RPC-utilizing process, create an intermediate thread that may then make the request of the RPC-utilizing process. In a further example, the originator 102 may make a request of another RPC-utilizing process, and that other RPC-utilizing process may then make the request of the RPC-utilizing process 104. In example implementations, the originator 102 may be a security exploit or a component compromised by a security exploit.

As noted above, the RPC-utilizing process 104 may be any kind of program that utilizes the RPC library as a communication interface. Processes or threads communicating with the RPC-utilizing process 104 may be on the same computing device as the RPC-utilizing process 104 or on a different computing device. Such processes/threads may each communicate with the RPC-utilizing process 104 though one of a named pipe, a socket, or an advanced local procedure call (ALPC) port or ALPC connection. As shown in FIG. 1, the RPC-utilizing process 104 operates in user-mode 106.

In further implementations, for each request received, the RPC-utilizing process 104 may create a user-mode worker thread to process that request. Each worker thread may be associated with a TEB 122, which may maintain information about the worker thread. The TEB 122 for a worker thread may also point to a RPC-specific field 126 that stores a copy of the request message 114. The TEBs 126 of the worker threads of the RPC-utilizing process 104 and the RPC-specific field 126 are referred to herein as "RPC data structures." Each worker thread may also make kernel-mode requests associated with the processing of the request message 114.

In some implementations, the security agent 108 is any sort of security agent. The security agent 108 may be a kernel-mode security agent implemented in kernel-mode 110, a security agent implemented in user-mode 106, a security agent implemented partially in user-mode 106 and partially in kernel-mode 110, or a security agent implemented via a hypervisor. The security agent 108 may be installed by and configurable by a remote security service, receiving, and applying while live, reconfigurations of components of the security agent 108. Such reconfigurations may cause updates to any component(s) of the security agent 108. The security agent 108 may perform at least one of monitoring events on the computing device implementing that security agent 108, maintaining state about some or all of the events on that computing device, notifying the remote security service of one or more events on the computing device, or taking action responsive to a security exploit associated with one or more events on the computing device. An example security agent 108 is described in greater detail in U.S. patent application Ser. No. 13/492,672, entitled "Kernel-Level Security Agent" and filed on Jun. 8, 2012.

As shown in FIG. 1, the operations taken to identify the originator 102 may result from an initial request, at 112, by the originator 102. As mentioned further herein, the request may be directly sent, at 112, from the originator 102 to the RPC-utilizing process 104 or indirectly sent, at 112, through, for instance, an intermediate thread, through another RPC-utilizing process, or through a command shell. Upon receiving the request message 114 associated with the request, the RPC-utilizing process 104 may process the request message 104 in user-mode 106. Such user-mode processing may involve creation, by the RPC-utilizing process 104 of a worker thread. The worker thread may be represented by a TEB 122, which may make one or more kernel-mode requests associated with processing of the request message 114. Such kernel-mode requests may include at least one of process creation, thread creation, writing to a registry, reading from the registry, creating a file, opening a file, reading a file, writing a file, mapping a file, sending or receiving a network packet, creating or opening a handle to an object, or performing registry operations.

In various implementations, the security agent 108 receives, at 116, event notifications based on the kernel-mode requests of the RPC-utilizing process 104. These kernel-mode requests may each correspond to one or more kernel-mode events, and the security agent 108 may register to receive event notifications for those kernel-mode events. For example, the security agent 108 may register with hooks or filters to receive notifications of the kernel-mode events or may monitor locations in memory or log files, or spawn a thread to do so, observing kernel-mode events associated with the log files or memory locations. In one example, the security agent 108 may register to be notified of registry writes. When a worker thread of the RPC-utilizing process 104 involved in processing the request message 114 makes a kernel-mode request to write to the registry, the security agent 108 will receive an event notification for the receipt of that kernel-mode request.

In further implementations, at 118, the security agent 108 then determines, based on the one or more event notifications, whether the RPC-utilizing process 104 is engaged in user-mode processing of request message 114. In some implementations, the determining at 118 is based on the configuration of the security agent 108. For example, the configuration may specify that if a specific combination of event notifications is received within a time period, the security agent 108 should retrieve a request message 114 whose processing is associated with those event notifications and identify its originator 102. In some implementations, the security agent 108 may include a correlation mechanism that accumulates the event notifications and generates a detection event when the specific combination of event notifications is received. Such a detection event may be provided to another component of the security agent 108 (e.g., an engine component) for further processing. Additionally, the security agent 108 may be configured to guard against false positives. In some examples, a specific combination of event notifications may have an additional, benign explanation which would not require further processing. To determine whether the combination of event notifications is a false positive, the security agent 108 may retrieve A) information included a kernel-mode request message associated with one of the one or more kernel-mode events or B) state information retained by the security agent and/or the OS and compare it to expected information specific by the configuration of the security agent 108. If there is a match, the security agent 108 determines that the combination of event notifications does not represent a false positive and proceeds with further processing to identify the originator 102.

Upon determining that the RPC-utilizing process 104 is processing the request message 114, the security agent 108 may retrieve the request message 114. In some implementations, the security agent 108 includes an engine component that is configured to retrieve the request message 114 and identify the originator 102. As mentioned further herein, the engine component may receive a detection event from a correlation mechanism of the security agent 108 when a combination of event notifications associated with processing of the request message 114 is received by the correlation mechanism. Further, the engine component may include an engine plug-in for each type of request message.

To retrieve the request message 114, the security agent 108 first determines, at 120, a data structure, such as a TEB 122, of a current thread. Upon receiving event notifications and determining that they indicate user-mode processing of a request message 114, the security agent 108 requests the TEB 122 of the current thread from the OS. That current thread will be the worker thread involved in the user-mode processing of the request message 114. The TEB 122 may include information about the worker thread and a pointer or identifier of an RPC-specific field 126 of OS data structure(s) 128. The pointer/identifier of the RPC-specific field 126 may or may not be obfuscated. Next, at 124, the security agent 108 traces from the pointer or identifier in the TEB 122 to the RPC-specific field 126 that stores a copy of the request message 114. If the pointer/identifier is obfuscated, the security agent 108 may deobfuscate the pointer/identifier before tracing at 124.

Upon tracing to the request message 114, the security agent 108 may retrieve the request message 114. This may include, at 130, identifying the originator of the request message 114 based on metadata (e.g., header information) associated with the request message 114. The security agent 108 may also retrieve other information from the metadata of the request message 114, such as a communication protocol used, which may be indicative of whether the originator 102 is local or remote to the computing device including the RPC-utilizing process 104 and security agent 108. In some implementations, the security agent 108 may be configured to retrieve additional parameters associated with the request message 114 and may retrieve and demarshall the payload of the request message 114 to do so.

In further implementations, identifying the originator 102, at 130, may include retrieving a named pipe, socket address, or ALPC port or ALPC connection associated with the request message 114 and utilizing the named pipe, socket address, or ALPC port or ALPC connection to retrieve a process identifier, thread identifier, remote client computer name or IP address, or any combination of such identifiers, names, and addresses. Also or instead, the security agent 108 may retrieve a copy of the request message 114 from the kernel. Such a kernel copy may include request message 114 metadata and a payload. That metadata and/or payload may be compared to the metadata and/or payload stored in user-mode 106 by the RPC-utilizing process 104 and, if there is a conflict, the security agent 108 may generate an alert. Further, in some implementations, the security agent 108 may be configured to only identify the originator 102 based on the metadata of the kernel copy of the request message 114 and/or to only retrieve and use payload of the kernel copy of the request message 114.

In some implementations, the receiving at 116, the determining at 118, the determining at 120, the tracing at 124, and retrieving at 130 may all be performed by the security agent 108 in kernel-mode 110.

In various implementations, the metadata of the request message 114 may identify a command shell as the sender (e.g., though a command prompt, such as AT or schtasks). When such a sender is identified, the security agent may identify the parent process of the command shell as the originator 102.

In some implementations, the metadata of the request message 114 may identify a specific thread as the sender. Based on its configuration, the security agent 108 may determine that the specific thread is not the originator 102, but is, rather, an intermediate thread invoked by another thread (e.g., an RPC-utilizing thread) of a same process (e.g., a scripting engine). Based on its configuration, the security agent 108 may identify that other, invoking thread and trace from that other, invoking thread to the actual originator 102. Such further tracing may involve some or all of the operations described further herein.

In further implementations, the metadata of the request message 114 may identify another RPC-utilizing process 104 as the sender. When another RPC-utilizing process 104 is identified as the sender, the security agent 108 may repeat the operations described further herein to identify the sender of the request message processed by that other RPC-utilizing process 104. Such iterations may continue until the originator 102 is identified.

In various implementations, based on the identity of the originator 102, based on other factors (e.g., parameters from the payload of the request message 114), or based on both, the security agent 108 may take action to prevent or mislead. For example, the security agent 108 may prevent further activity associated with the request message 114 by halting the processing of the request message 114 by the RPC-utilizing process 104. Also or instead, the security agent 108 may stop execution of the originator 102 or of a process associated with the originator 102. In further example(s), to mislead, the security agent 108 may modify a payload of a kernel-mode request message made by the RPC-utilizing process 104 as part of processing the request message 114 or may otherwise alter the processing of the unmodified request message 114 (e.g., "pretending" to execute a kernel-mode operation of the RPC-utilizing process that is processing the request message 114) to achieve a like effect. Such action(s) may provide the originator 102 or an associated process with a misleading result from the processing of the request message 114.

Example System

FIG. 2 illustrates a component level view of a monitored computing device configured with an RPC-utilizing process to handle request messages in user-mode and a security agent to detect, from kernel-mode, the user-mode processing of those request messages. As illustrated, computing device 200 comprises a system memory 202 storing client(s) 204, a registry 206, a RPC-utilizing process 208, which includes thread(s) 210 and data structure(s) 212, and a security agent 214, which includes both an engine 216 with plug-in(s) 218 and also correlation mechanism 220. Also, computing device 200 includes processor(s) 222, a removable storage 224 and non-removable storage 226, input device(s) 228, output device(s) 230 and communication connections 232 for communicating with other computing devices 234.

In various embodiments, system memory 202 is volatile (such as RAM), non-volatile (such as ROM, flash memory, etc.) or some combination of the two. The client(s) 204, registry 206, RPC-utilizing process 208, thread(s) 210, data structure(s) 212, a security agent 214, engine 216, plug-in(s) 218, and correlation mechanism 220 are examples of similarly named components further describe herein.

In some embodiments, the processor(s) 222 include a central processing unit (CPU), a graphics processing unit (GPU), or both CPU and GPU, or other processing unit or component known in the art.

Computing device 200 also includes additional data storage devices (removable and/or non-removable) such as, for example, magnetic disks, optical disks, or tape. Such additional storage is illustrated in FIG. 2 by removable storage 224 and non-removable storage 226. Non-transitory computer-readable media may include volatile and nonvolatile, removable and non-removable media implemented in any method or technology for storage of information, such as computer readable instructions, data structures, program modules, or other data. System memory 202, removable storage 224 and non-removable storage 226 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 200. Any such non-transitory computer-readable media may be part of the computing device 200.

Computing device 200 also has input device(s) 228, such as a keyboard, a mouse, a touch-sensitive display, voice input device, etc., and output device(s) 230 such as a display, speakers, a printer, etc. These devices are well known in the art and need not be discussed at length here.

Computing device 200 also contains communication connections 232 that allow the computing device 200 to communicate with other computing devices 234.

Example Process

Figure 3:
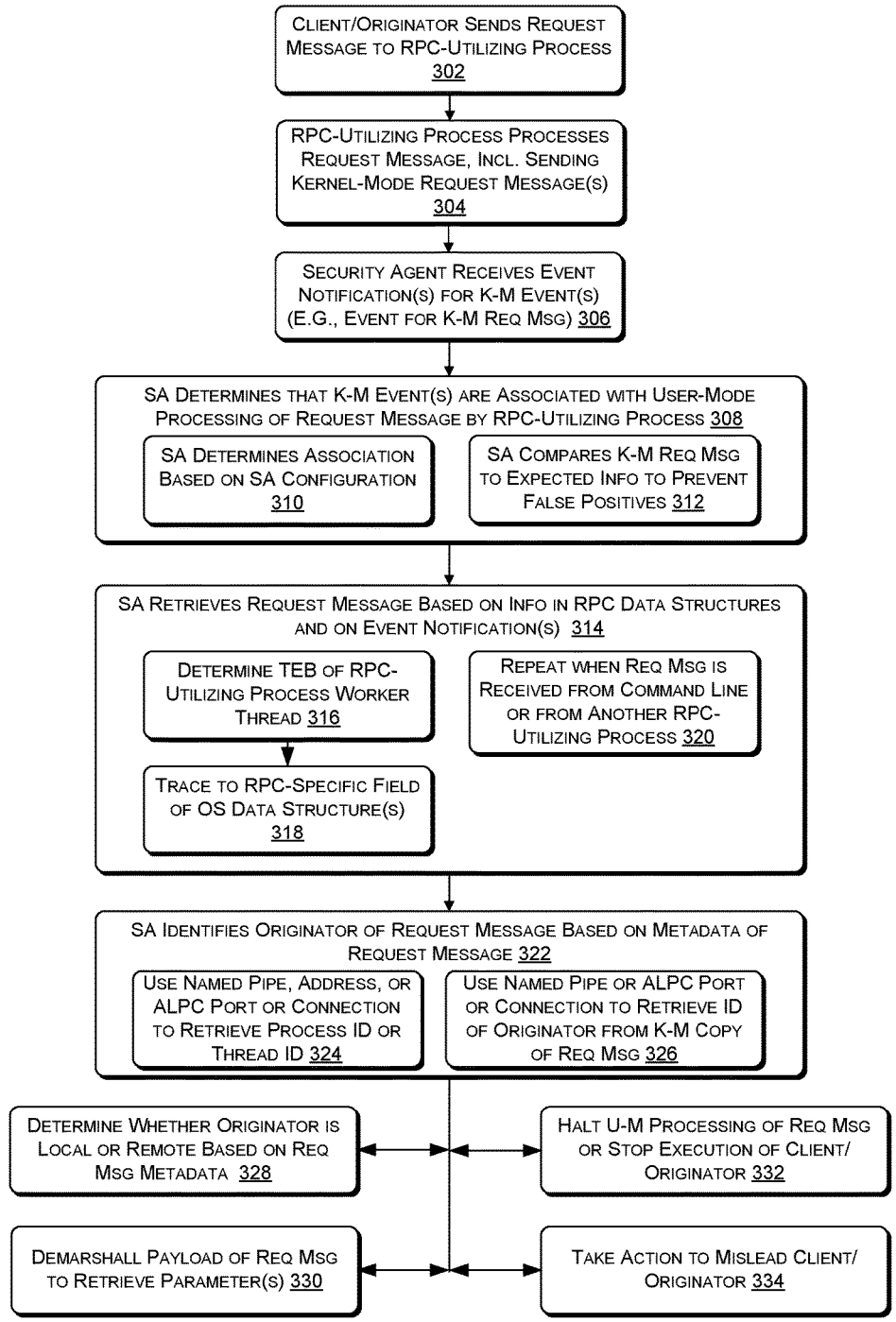
FIG. 3 illustrates example operations performed by a security agent, the operations including determining that kernel-mode event(s) are associated with user-mode processing of a request message by an RPC-utilizing process, retrieving that request message based on RPC data structure(s) and on event notifications, and identifying an originator of the request message.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates example operations performed by a security agent, the operations including determining that kernel-mode event(s) are associated with user-mode processing of a request message by an RPC-utilizing process, retrieving that request message based on RPC data structure(s) and on event notifications, and identifying an originator of the request message.

The operations include, at 302, a client application (also referred to as an originator) sending a request message to an RPC-utilizing process of that client application's computing device. The request message may be, for example, a domain name service query, a request to print a document, a request to change a firewall setting, or a request to create a new account.

At 304, the RPC-utilizing process may process, in user-mode, the request message. Such processing may include sending one or more kernel-mode request messages, such as request messages associated with process creation, thread creation, writing to a registry, reading from the registry, creating a file, opening a file, reading a file, writing a file, mapping a file, sending or receiving a network packet, creating or opening a handle to an object, performing registry operations.

At 306, a security agent of the computing device receives one or more event notifications respectively associated with one or more kernel-mode events. The kernel-mode events may correspond to the actions sought by the kernel-mode request messages of the RPC-utilizing process (e.g., process creation, thread creation, writing to a registry, reading from the registry, user group creation, writing to a task cache, reading from a task cache, creating a file, opening a file, reading a file, writing a file, mapping a file sending or receiving a network packet, creating or opening a handle to an object, performing registry operations).

At 308, the security agent determines, based on the one or more event notifications, that the one or more kernel-mode events are associated with user-mode processing by the RPC-utilizing process of the request message. At 310, the determining may be based at least in part on a configuration of the security agent. At 312, the determining may further comprise comparing A) information included in one of the kernel-mode request messages associated with one of the one or more kernel-mode events or B) state information retained by the security agent and/or the OS to expected information to in order to prevent false positives.

At 314, the security agent retrieves the request message based on information included in one or more RPC data structures (e.g., a worker thread TEB and/or an RPC-specific field of OS data structure(s)) and based on the one or more event notifications. The retrieving may include, at 316, determining a TEB of a current thread being processed by the OS. The current thread may be a worker thread of the RPC-utilizing process that is involved in the user-mode processing of the request message. At 318, the retrieving may further include tracing from the TEB to the request message through an RPC-specific field of OS data structure(s). The TEB may point to the RPC-specific field, and the RPC-specific field may store a copy of the request message. The security agent may then retrieve the request message from the RPC-specific field. At 320, when the request message is received by the RPC-utilizing process from a command shell or from another RPC-utilizing process, the security agent may repeat the retrieving at 314.

At 322, the security agent identifies the originator of the request message based on metadata of the request message. At 324, the identifying includes determining a named pipe, a socket address, or an ALPC port or ALPC connection associated with the request message and utilizing the named pipe, the socket address, or the ALPC port or ALPC connection to retrieve a process identifier of the originator, a thread identifier of the originator, remote client computer name or IP address of the originator, or any combination of such identifiers, names, and addresses. At 326, the identifying includes determining a named pipe or ALPC port or ALPC connection associated with the request message and utilizing the named pipe or the ALPC port or ALPC connection to retrieve an identifier of the originator from the metadata of the request message.

At 328, the security agent may determine whether originator is local or remote based on the metadata of the request message.

At 330, the security agent may demarshall a payload of the request message to retrieve one or more parameters. In some implementations, the demarshalling may include retrieving a payload of the request message from a kernel-mode copy of the request message.

At 332, the security agent may halt processing of the request message by the RPC-utilizing process or stop execution of the originator or a process associated with the originator.

At 334, the security agent may take action to mislead the originator.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
    one or more processors; and
    a security agent configured to be operated by the one or more processors to perform operations including:
        receiving one or more event notifications respectively associated with one or more kernel-mode events;
        determining, based on the one or more event notifications, that the one or more kernel-mode events are associated with user-mode processing by a remote-procedure-call-utilizing (RPC-utilizing) process of a request message;
        retrieving the request message based on information included in one or more remote procedure call (RPC) data structures and based on the one or more event notifications, wherein the retrieving includes:
            determining a thread environment block (TEB) of a worker thread that is associated with the user-mode processing by the RPC-utilizing process of the request message, and
            tracing from the TEB to the request message through an RPC-specific field of an operating system (OS) data structure; and
        identifying an originator of the request message based on metadata of the request message.

2. The computing device of claim 1, wherein the security agent includes an engine configured to perform the retrieving and the identifying and an engine plug-in for each type of request message.

3. The computing device of claim 2, wherein the security agent includes a correlation mechanism to accumulate event notification(s) of the one or more event notifications and to alert the engine when the one or more event notifications have all been received.

4. A method implemented by a security agent on a computing device, the method comprising:
    receiving one or more event notifications respectively associated with one or more kernel-mode events;
    determining, based on the one or more event notifications, that the one or more kernel-mode events are associated with user-mode processing by a remote-procedure-call-utilizing (RPC-utilizing) process of a request message;
    retrieving the request message based on information included in one or more remote procedure call (RPC) data structures and based on the one or more event notifications; and
    identifying an originator of the request message based on metadata of the request message.

5. The method of claim 4, wherein the one or more kernel-mode events include at least one of process creation, thread creation, writing to a registry, reading from the registry, creating a file, opening a file, reading a file, writing a file, or mapping a file, sending or receiving a network packet, creating or opening a handle to an object, or performing registry operations.

6. The method of claim 4, wherein the determining is based at least in part on a configuration of the security agent.

7. The method of claim 4, wherein the request message is a domain name service query, a request to print a document, a request to change a firewall setting, or a request to create a new account.

8. The method of claim 4, wherein the determining further comprises comparing A) information included a kernel-mode request message associated with one of the one or more kernel-mode events or B) state information retained by the security agent and/or the OS to expected information to prevent false positives.

9. The method of claim 4, wherein the retrieving comprises:
    determining a thread environment block (TEB) of a worker thread that is associated with the user-mode processing by the RPC-utilizing process of the request message, and
    tracing from the TEB to the request message through an RPC-specific field of an operating system (OS) data structure,
    wherein the RPC data structures include the TEB and the RPC-specific field.

10. The method of claim 9, wherein the tracing comprises:
    retrieving the request message from the RPC-specific field.

11. The method of claim 4, wherein the request message is received by the RPC-utilizing process from a command shell, and the method further comprises repeating the retrieving and identifying until the originator is identified.

12. The method of claim 4, wherein the retrieving comprises:
    retrieving an intermediate request message based on information included in the RPC data structures and based on the one or more event notifications;

determining that an originator of the intermediate request message is an intermediate thread invoked by another thread of a same process;

retrieving the request message based on information included in additional one or more RPC data structures associated with the other thread.

13. The method of claim 4, wherein the identifying includes determining a named pipe, a socket address, or an advanced local procedure call (ALPC) port or connection associated with the request message and utilizing the named pipe, the socket address, or the ALPC port or connection to retrieve a process identifier of the originator, a thread identifier of the originator, a remote client computer name or IP address of the originator, or any combination of the process identifier, the thread identifier, and/or the remote client computer name or IP address.

14. The method of claim 4, wherein the identifying includes determining a named pipe or ALPC port or connection associated with the request message and utilizing the named pipe or the ALPC port or connection to retrieve an identifier of the originator from a kernel-mode copy of metadata of the request message.

15. The method of claim 4, further comprising determining whether originator is local or remote based on the metadata of the request message.

16. The method of claim 4, further comprising demarshalling a payload of the request message to retrieve one or more parameters.

17. The method of claim 4, further comprising halting processing of the request message by the RPC-utilizing process or stopping execution of the originator or a process associated with the originator.

18. The method of claim 4, further comprising taking action to mislead the originator.

19. A non-transitory computer-readable medium having executable instructions implementing a security agent stored thereon that, when executed by a computing device, perform operations comprising:

receiving one or more event notifications respectively associated with one or more kernel-mode events;

determining, based on the one or more event notifications, that the one or more kernel-mode events are associated with user-mode processing by a remote-procedure-call-utilizing (RPC-utilizing) process of a request message;

retrieving the request message based on information included in one or more remote procedure call (RPC) data structures and based on the one or more event notifications; and identifying an originator of the request message, wherein the identifying includes utilizing a named pipe or an advanced local procedure call (ALPC) port or connection associated with the request message to retrieve an identifier of the originator from a kernel-mode copy of metadata of the request message.

20. The non-transitory computer-readable medium of claim 19, further comprising retrieving a payload of the request message from the kernel-mode copy of the request message.

21. The non-transitory computer-readable medium of claim 19, wherein the retrieving comprises:

determining a thread environment block (TEB) of a worker thread that is associated with the user-mode processing by the RPC-utilizing process of the request message, and tracing from the TEB to the request message through an RPC-specific field of an operating system (OS) data structure, wherein the RPC data structures include the TEB and the RPC-specific field.

* * * * *